(12) United States Patent
Lee et al.

(10) Patent No.: US 7,825,713 B2
(45) Date of Patent: Nov. 2, 2010

(54) ABSOLUTE TIME DELAY GENERATING DEVICE

(75) Inventors: Chen-Yi Lee, Hsinchu (TW); Jui-Yuan Yu, Hsinchu (TW); Chien-Ying Yu, Hsinchu (TW); Juinn-Ting Chen, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 12/286,765

(22) Filed: Oct. 2, 2008

(65) Prior Publication Data

US 2010/0013536 A1 Jan. 21, 2010

(30) Foreign Application Priority Data

Jul. 21, 2008 (TW) .............................. 97127581 A

(51) Int. Cl.
*H03H 11/26* (2006.01)
(52) U.S. Cl. ..................... 327/276; 327/362; 327/269; 327/277
(58) Field of Classification Search ......... 327/261–264, 327/269, 270, 276–278
See application file for complete search history.

(56) References Cited

U.S. PATENT DOCUMENTS 6,169,436 B1 * 1/2001 Marbot ....................... 327/270
7,034,597 B1 * 4/2006 Mo et al. ..................... 327/276
2003/0160645 A1 * 8/2003 Eto et al. ..................... 327/276
2006/0097767 A1 * 5/2006 Lu .............................. 327/291

* cited by examiner

*Primary Examiner*—Lincoln Donovan
*Assistant Examiner*—Brandon S Cole
(74) *Attorney, Agent, or Firm*—Peter F. Corless; Steven M. Jensen; Edwards Angell Palmer & Dodge LLP

(57) ABSTRACT

An absolute time delay generating device includes a PVT (process-voltage-temperature) detection device and a delay-timing generator. The PVT detection device includes at least a delay module and a signal phase/frequency control module. The delay module includes a control unit and a reference unit. The control unit differs from the reference unit in sensitivity of delay property to PVT. The delay module compares phase or frequency differences generated when origin signals pass through the control unit and reference unit respectively, and produce delay parameters of the delay module. The signal phase/frequency control module receives and compares the delay parameters to determine an ambient PVT condition for the absolute time delay generating device, so as to control and correct the delay-timing generator and thereby generate accurate absolute time delay. Under various PVT influences, the absolute time delay generating device is capable of generating accurate, absolute time signals.

20 Claims, 2 Drawing Sheets

ABSOLUTE TIME DELAY GENERATING DEVICE

BACKGROUND OF THE INVENTION

1. Field of the Invention

This invention relates to delay generating devices, and more particularly, to an absolute time delay generating device for correcting time delay.

2. Description of Related Art

Clock generator chip can be considered as the heart of a digital electronic device. For example of a personal computer, each system has one or two clock generators responsible for generating ten or more reference clock signals in order to control and regulate system processing speed, memory access, real-time multimedia, network traffic, and wireless network connection.

In modern days, the usage and development of the clock generators are no longer restricted to computers. In practice, many parts of electronic equipment, engine rooms of telecommunication exchange equipment, home entertainment systems, and digital cameras all require clock reference sources.

However, the clock generator is incapable of independently generating accurate baseband frequency. A set of stable reference signals are required for deriving accurate baseband signals via comparison. The stable reference signal is generated by applying an external voltage to a quarts crystal, which, after receiving the external voltage, would generate a stable oscillation signal immune to the ambient environment, thereby forming a signal generating terminal of the clock generator for stabilizing the reference signal.

However, in the field of IC (integrated circuit) design, ICs have been made toward having miniaturized dimensions. The approach of using the quartz crystal as a signal generating terminal of the clock generator for generating reference signals is restricted by physical features of the quartz crystal, for example, the size of the quartz crystal is unlikely to be further reduced. Hence, the quartz crystal is becoming inappropriate for use with miniaturized ICs.

In a situation of not using external quartz crystal, providing a micro-electromechanical or analog circuit is a common approach to generate reference signals. However, the micro-electromechanical or analog circuit in the field of miniaturized-IC design is likely to be influenced by an ambient PVT (process-voltage-temperature) environment, e.g. process defect, voltage noise or temperature variation, thereby undesirably influencing stability of the reference signals.

Therefore, the problem to be solved in the field of micro oscillator design is to develop an absolute time delay generating device, which does not use an external quartz crystal as a signal generating terminal of a clock generator, and which may overcome drawbacks such as output frequency variation caused by change of an ambient PVT environment.

SUMMARY OF THE INVENTION

In view of the drawbacks of the prior art mentioned above, it is a primary objective of the present invention to provide an absolute time delay generating device, which does not use an external quartz crystal as a reference source, and generates a precise frequency for overcoming drawbacks such as output frequency variation caused by change of an ambient PVT environment.

To achieve the aforementioned and other objectives, the present invention provides an absolute time delay generating device, which includes: a PVT detection device and a delay-timing generator. The PVT detection device includes a signal phase/frequency control module and a plurality of delay modules, wherein each of the delay modules includes a control unit and a reference unit.

Each of the delay modules is configured to compare delay statuses generated by allowing original signals to pass through the control unit and the reference unit respectively, so as to generate a delay parameter of each of the delay modules. The signal phase/frequency control module is configured to receive and compare the delay parameters, so as to determine a delay status of the absolute time delay generating device, and thereby generate a correction signal based on the delay status of the absolute time delay generating device. It should be noted that, the number of the delay modules is not limited in the present invention but is flexible depending on practical applications and needs. A delay status between the control unit and the reference unit of each of the delay modules corresponds to a difference in response to a PVT variation, and the difference is a phase difference or a frequency difference.

In a preferred embodiment, the signal phase/frequency control module further includes a delay status information unit configured to generate a correction signal generation parameter based on the delay status of the absolute time delay generating device and to generate a correction signal according to the correction signal generation parameter.

In another preferred embodiment, the absolute time delay generating device of the present invention further includes a digital control oscillator for generating an oscillation signal, wherein the digital control oscillator comprises a controllable delay line for receiving the correction signal, thereby adjusting a delay status of the oscillation signal based on the correction signal. Specifically, after receiving the correction signal, the digital control oscillator adjusts the length of the controllable delay line based on the correction signal, so as to correct the delay status of the oscillation signal.

The control unit and the reference unit of each of the delay modules are configured to receive the original signals and generate a control signal and a reference signal respectively.

The original signals received by the control unit and the reference unit are of the same phase or of the same frequency. In other words, delay phase difference between the original signal inputted to the control unit and the original signal inputted to the reference unit is zero.

Moreover, the control unit and the reference unit comprise delay elements having different delay properties respectively for generating delay statuses between the control signal and the reference signal. The delay elements having different delay properties mean that the delay elements included in the control unit and the reference unit are made of different materials, have different serial connection numbers and/or have different architectural designs of circuitry, thereby having different delay properties from each other.

When the original signals enter the control unit and the reference unit respectively and pass through the delay elements having different delay properties, a delay status can be generated between a control signal outputted from the control unit and a reference signal outputted from the reference unit. In other words, the control signal and reference signal have different phases or different frequencies from each other.

Furthermore, the control units of the plurality of delay modules comprise delay elements having different delay properties respectively. The delay elements having different delay properties mean that the delay elements are made of different materials, have different serial connection numbers and/or have different architectural designs of circuitry, thereby having different delay properties from each other.

The original signals passing through the control units of the plurality of delay modules have the same phase. In other words, delay phase difference between the original signals passing through the control units is zero. When the original signals enter the control units of the plurality of delay modules respectively and pass through the delay elements having different delay properties respectively, a delay status can be generated between a plurality of control signals outputted from the control units, that is, the plurality of control signals have different phases or different frequencies from each other.

Each of the delay modules further includes a phase/frequency detection unit for comparing delay statuses between the control signal and the reference signal, and generating the delay parameter of each of the delay modules.

In a preferred embodiment, the delay parameter is a ratio, wherein the ratio is defined as delay of variable control unit divided by delay of reference unit, which can be expressed as, $$\tau(P, V, T) = \frac{d_{VAR}(P, V, T)}{d_{REF}(P, V, T)},$$

wherein $d_{VAR}(P,V,T)$ is the delay of variable control unit, and $d_{REF}(P,V,T)$ is the delay of reference unit. According to the above disclosure, the delay of the reference unit, $d_{REF}(P,V,T)$, for the plurality of delay modules is the same, while the delay of variable control unit, $d_{VAR}(P,V,T)$, is not identical for the plurality of delay modules.

When various PVT conditions cause the plurality of delay modules to generate different delay statuses, the plurality of delay modules may have a plurality of phase/frequency leading or lagging combinations. The ratio under a particular PVT condition can be obtained by the phase/frequency combinations, and then the delay module and the delay status thereof corresponding to the ratio can be used as a delay correction parameter for the absolute time delay generating device under this PVT condition, thereby determining the delay status of the absolute time delay generating device.

Therefore, by using the absolute time delay generating device and the dynamic correction mechanism for stabilizing the reference source against ambient PVT influence as disclosed by the present invention, the delay parameter of each of the delay modules can be analyzed in various PVT conditions, thereby determining a delay status of the absolute time delay generating device caused by a current PVT condition, and further generating a correction signal to allow the oscillator to maintain its stability and accuracy even under the influence of PVT variation.

Accordingly, the absolute time delay generating device according to the present invention does not use an external quartz crystal as a reference signal generating terminal of a clock generator. The preset invention is capable of dynamically detecting a current PVT condition and performing instant system correction, thereby overcoming the drawback of output frequency variation caused by an ambient PVT environment to miniaturized ICs as in the prior art.

BRIEF DESCRIPTION OF DRAWINGS

The present invention can be more fully understood by reading the following detailed description of the preferred embodiments, with reference made to the accompanying drawings, wherein.

DETAILED DESCRIPTION OF PREFERRED EMBODIMENTS

Preferred embodiments of an absolute time delay generating device proposed by the present invention are described as follows with reference to FIGS. 1 and 2. It should be understood that the drawings are simplified schematic diagrams only showing the components relevant to the present invention, and the layout of components could be more complicated in practical implementation.

The following embodiments provide detailed descriptions of the absolute time delay generating device of the present invention, but the scope of the present invention is not restricted to the embodiments described.

Figure 1:
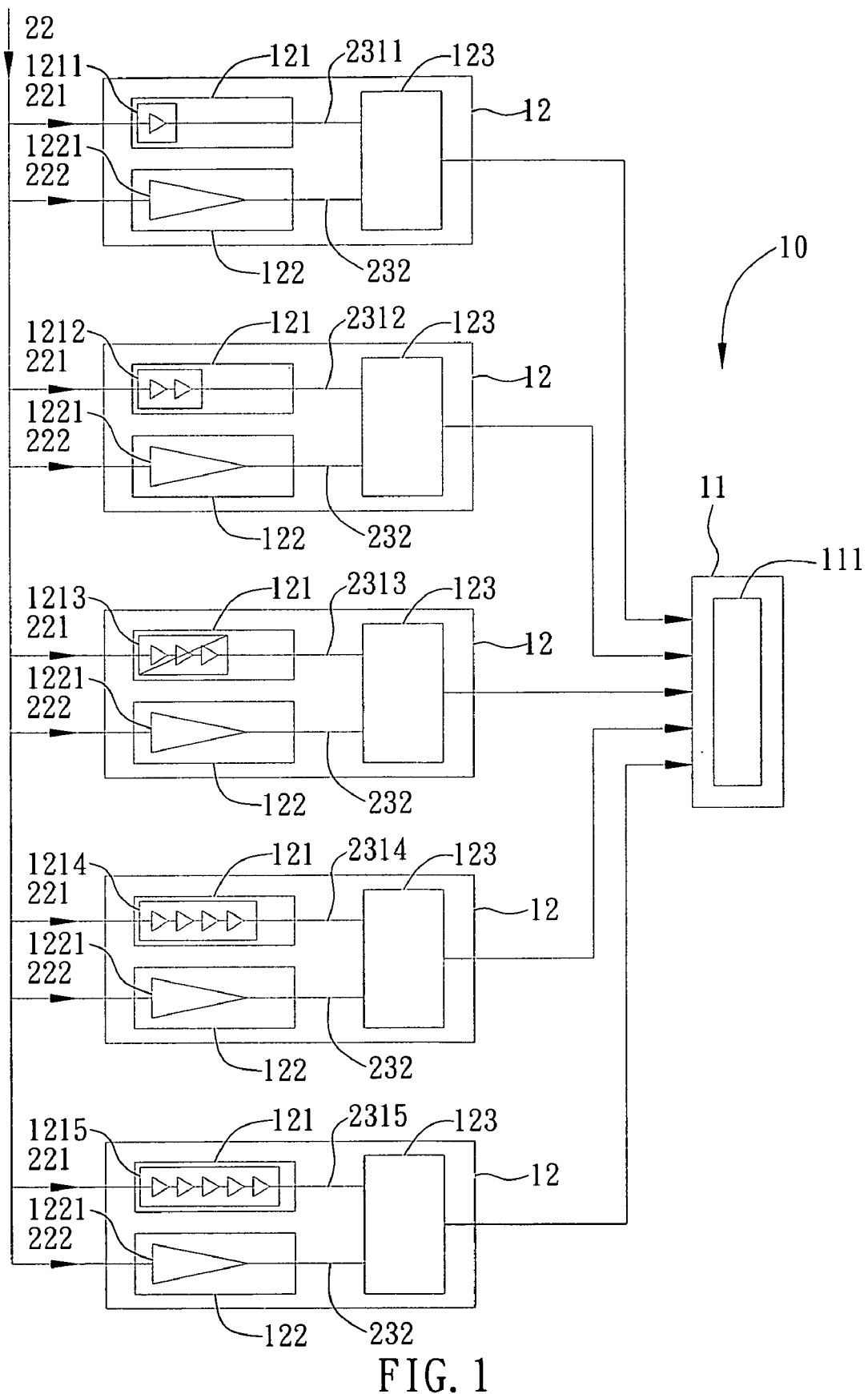
FIG. 1 is a block schematic diagram showing basic architecture of an absolute time delay generating device according to the present invention.

FIG. 1 is a block schematic diagram showing basic architecture of an absolute time delay generating device according to the present invention. As shown in FIG. 1, the absolute time delay generating device 10 of the present invention includes: a signal phase/frequency control module 11 and a plurality of delay modules 12. Each of the delay modules 12 includes a control unit 121, a reference unit 122, and a phase/frequency detection unit 123. The control unit 121 and the reference unit 122 include delay elements 1211 and 1221 having different delay properties respectively.

It should be noted that, the number of the delay modules 12 is not critical in the present invention. In other words, the absolute time delay generating device 10 has a flexible number of the delay modules 12 depending on practical applications and requirements. For the sake of easy illustration, FIG. 1 only shows five delay modules 12, the number of the delay modules 12 in the present invention is not limited to that shown in FIG. 1 but can be flexibly chosen in other embodiments.

Each of the delay modules 12 compares delay statuses obtained after an original signals 22 passes through the control unit 121 and the reference unit 122 respectively, so as to generate a plurality of delay parameters for the delay modules 12. The delay statuses can be phase or frequency differences. The following embodiment is explained using phase differences as an example. The signal phase/frequency control module 11 is used to receive and compare the plurality of delay parameters, so as to determine a delay status of the absolute time delay generating device 10 in a PVT environment and further generate a correction signal according to the determined delay status. Each of the delay module 12 obtains the delay statuses in a manner that, the control unit 121 and the reference unit 122 are used to receive the original signal 22, and then the original signal 22 is allowed to pass through the delay elements 1211 and 1221 having different delay properties respectively, such that different delay statuses are generated between a control signal 2311 outputted from the control unit 121 and a reference signal 232 outputted from the reference unit 122.

The original signal 22 includes an original signal 221 received by the control unit 121 and an original signal 222 received by the reference unit 122, wherein the original signals 221 and 222 are of the same phase. In other words, there is no delay phase difference between the original signal 221 inputted to the control unit 121 and the original signal 222 inputted to the reference unit 122.

Moreover, the delay elements having different delay properties mean that the delay elements included in the control unit 121 and the reference unit 122 are made of different materials and/or have different numbers of serial connections, thereby having different delay properties. It should be noted that, in addition to the plurality of parallel delay modules 12 shown in FIG. 1, the delay module architecture may also be made based on a single set of counter or a single set of phase-locked loop. However, the delay module 12 has to include a reference unit 122 and a control unit 121, wherein a delay status (i.e. time delay) formed between the reference unit 122 and the control unit 121 corresponds to a difference in response to the PVT variation, while the reference unit 122 and the control unit 121 can be different from each other in phase or frequency. Furthermore, the number of the control unit 121 and the reference unit 122 in the delay module 12 is not limited. However, the differences in delay performance between a reference unit and a control unit, between a reference unit and a reference unit, and between a control unit and a control unit correspond to PVT variations.

It should be particularly noted that, for the sake of easy illustration, the delay elements 1211 and 1221 having different properties are shown by differently sized delay elements 1211 and 1221 in the drawings. However, it is understood that, to allow the delay elements 1211 and 1221 to have different properties is not restricted to the way shown in the drawings.

Specifically, the delay module 12 uses the control unit 121 and the reference unit 122 to receive the original signals 221 and 222 of the same phase respectively. After the original signals 221 and 222 are allowed to pass through the delay elements 1211 and 1221 having different delay properties respectively, delay statuses having different phases are generated between the control signal 2311 and reference signal 232 outputted from the control unit 121 and the reference unit 122 respectively.

In addition, the delay module 12 further comprises a phase/frequency detection unit 123, which is used to receive and compare the delay statuses between the control signal 2311 and the reference signal 232 and thereby detect the delay parameter of the delay module 12. Accordingly, by combining the delay module 12 with the phase/frequency detection unit 123, a PVT detection device can be obtained.

Further, as shown in FIG. 1, the five delay modules 12 each have a control unit 121, and the five control units 121 include delay elements 1211, 1212, 1213, 1214 and 1215 having different delay properties respectively.

The five delay element 1211, 1212, 1213, 1214 and 1215 have different delay properties because the delay elements 1211, 1212, 1213, 1214 and 1215 are made of different delay element materials and/or have different numbers of serial connections.

It should be particularly noted that, for the sake of easy illustration, the five delay element 1211, 1212, 1213, 1214 and 1215 having different delay properties are shown by having different numbers thereof in the drawings. However, it is understood that, to allow the five delay element 1211, 1212, 1213, 1214 and 1215 to have different properties is not restricted to the way shown in the drawings.

In addition, the original signals 221 passing through the five control units 121 respectively are of the same phase. In other words, there is no delay phase difference among the original signals 221 passing through the five control units 121. After these original signals 221 enter respectively the control units 121 and pass through the five delay element 1211, 1212, 1213, 1214 and 1215 having different delay properties, the original signals 221 allow delay statuses having different phases to be generated among the five control signals 2311, 2312, 2313, 2314 and 2315.

Specifically, when the original signals 221 respectively enter the control units 121 and pass through the five delay element 1211, 1212, 1213, 1214 and 1215 having different delay properties to allow delay statuses having different phases to be generated among the five control signals 2311, 2312, 2313, 2314 and 2315, then the phase/frequency detection units 123 receive and compare delay statuses between the five control signals 2311, 2312, 2313, 2314 and 2315 and the reference signals 232, so as to generate five delay parameters respectively corresponding to the five delay modules 12.

In a preferred embodiment, the delay parameter is selected as a specific ratio. The ratio can be defined as delay of variable control unit divided by delay of reference unit, i.e., $$\tau(P, V, T) = \frac{d_{VAR}(P, V, T)}{d_{REF}(P, V, T)},$$

wherein $d_{VAR}(P,V,T)$ is the delay of variable control unit, and $d_{REF}(P,V,T)$ is the delay of reference unit. In particular, the delay modules have the same delay of reference unit ($d_{REF}(P,V,T)$ is same for all the delay modules), but are different in the delay of variable control unit ($d_{VAR}(P,V,T)$ is not identical for all the delay modules).

Next, the signal phase/frequency control module 11 is configured to receive phase/frequency leading or lagging signals of the five delay modules 12, and thus current ratios can be obtained from the above equation according to the signals, such that the delay status of the absolute time delay generating device 10 can be determined according to the delay modules and delay statuses thereof corresponding to the obtained ratios. As a result, a delay correction signal of the absolute time delay generating device 10 in a particular PVT condition can be obtained.

Figure 2:
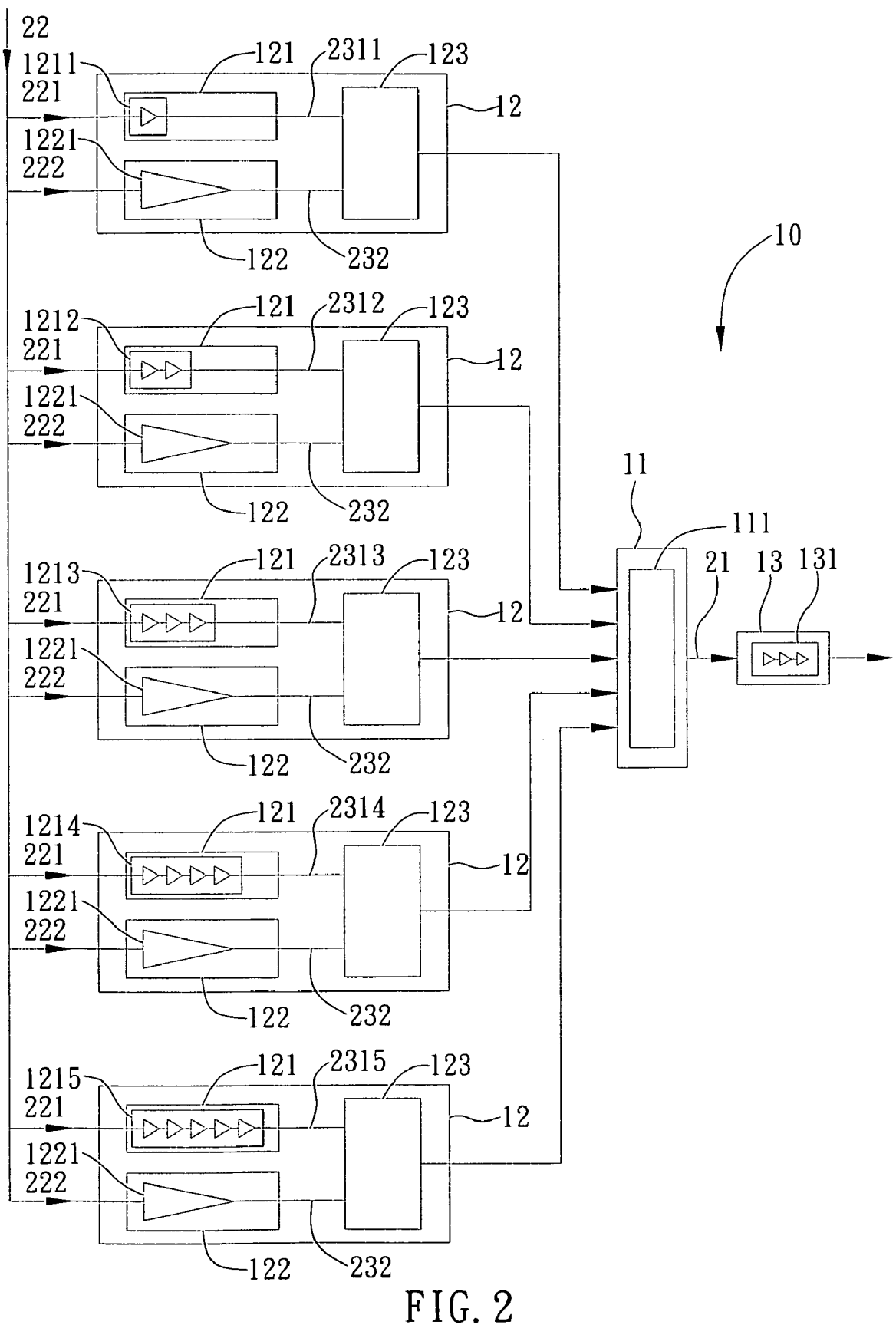
FIG. 2 is a block schematic diagram showing further architecture of the absolute time delay generating device according to the present invention.

FIG. 2 is a block schematic diagram showing further architecture of the absolute time delay generating device according to the present invention. As shown in FIG. 2, the signal phase/frequency control module 11 of the absolute time delay generating device 10 further includes a delay status information unit 111 having correction signal generation parameters. The delay status information unit 111 is used to compare the correction signal generation parameters and the delay status of the absolute time delay generating device 10 in the PVT environment so as to generate a correction signal 21.

The absolute time delay generating device 10 of the present invention further includes a delay-timing generator 13, which receives the correction signal, and adjusts a delay status of the delay-timing generator 13 according to the correction signal. Output of the delay-timing generator 13 can be signal delay at a periodic oscillation frequency or simple signal delay, and changing and adjusting the signal delay can be performed by digital or analog circuit control, wherein the digital circuit control is implemented in an encoded form, digit form, etc., and the analog circuit control can be voltage control or current control. In this embodiment, the delay-timing generator 13 is exemplified by a digital control oscillator for generating digital oscillation signals. In a preferred embodiment, the digital control oscillator 13 further includes a controllable delay line 131.

After the digital control oscillator 13 receives the correction signal 21, a delay status of the oscillation signals can be adjusted according to the correction signal 21. More specifically, after the digital control oscillator 13 receives the correction signal 21, the length of the controllable delay line 131 can be adjusted according to the correction signal 21, thereby controlling a delay status generated by signals passing through the controllable delay line 131 and further correcting the delay status of the absolute time delay generating device 10.

Therefore, by using the absolute time delay generating device and the dynamic correction mechanism for stabilizing the reference source against ambient PVT influence as disclosed by the present invention, the delay parameter of each of the delay modules can be analyzed in various PVT conditions, thereby determining a delay status of the absolute time delay generating device caused by a current PVT condition, and further generating a correction signal to allow the oscillator to maintain its stability and accuracy even under the influence of PVT variation.

Accordingly, the absolute time delay generating device according to the present invention does not use an external quartz crystal as a reference signal generating terminal of a clock generator. The present invention is capable of dynamically detecting a current PVT condition and performing instant system correction, thereby overcoming the drawback of output frequency variation caused by an ambient PVT environment to miniaturized ICs as in the prior art.

The foregoing descriptions of the detailed embodiments are only illustrated to disclose the features and functions of the present invention and are not interpreted as limiting the scope of the present invention. It should be understood to those in the art that all modifications and variations according to the spirit and principle of the disclosure of the present invention should fall within the scope of the appended claims.

What is claimed is:

1. An absolute time delay generating device, comprising:
   at least a delay module comprising a control unit and a reference unit, wherein the delay module is configured to compare delay statuses generated by allowing original signals to pass through the control unit and the reference unit respectively, so as to generate delay parameters;
   a signal phase/frequency control module configured to receive and compare the delay parameters so as to determine a delay status of the absolute time delay generating device according to the delay parameters and to generate absolute time delay based on the delay status of the absolute time delay generating device, wherein the signal phase/frequency control module comprises a delay status information unit configured to provide a correction signal generation parameter according to the delay status of the absolute time delay generating device and to generate a correction signal according to the correction signal generation parameter, wherein the delay status of the absolute time delay generating device corresponds to a phase difference or a frequency difference; and
   a delay-timing generator configured to receive the correction signal and adjust the delay status of the absolute time delay generating device based on the correction signal, allowing output of the delay-timing generator to be signal delay at a periodic oscillation frequency or simple signal delay, wherein the delay-timing generator is a digital control oscillator configured to generate an oscillation signal, receive the correction signal, and adjust a delay status of the oscillation signal based on the correction signal.

2. The absolute time delay generating device of claim 1, wherein the at least a delay module comprises a plurality of parallel delay modules, a delay module architecture based on a counter, or a delay module architecture based on a phase-locked loop, and wherein a delay status between the control unit and the reference unit of the delay module corresponds to a difference in response to a PVT variation, and the difference is a phase difference or a frequency difference.

3. The absolute time delay generating device of claim 1, wherein the digital control oscillator comprises a delay line, and the digital control oscillator is configured to receive the correction signal and adjust a length of the delay line based on the correction signal, so as to correct the delay status of the oscillation signal.

4. The absolute time delay generating device of claim 1, wherein the control unit and the reference unit are configured to receive the original signals and generate a control signal and a reference signal respectively.

5. The absolute time delay generating device of claim 4, wherein the original signal received by the control unit and the original signal received by the reference unit are of the same phase or of the same frequency.

6. The absolute time delay generating device of claim 4, wherein the control signal and the reference signal are of different phases or of different frequencies.

7. The absolute time delay generating device of claim 4, wherein the delay module further comprises a phase/frequency detection unit configured to compare delay statuses between the control signal and the reference signal, wherein the control signal and the reference signal are phase signals or frequency signals, so as to generate the delay parameter of the delay module.

8. The absolute time delay generating device of claim 7, wherein the control unit and the reference unit comprise delay elements having different delay properties respectively, and the delay elements having different delay properties are configured to generate the delay statuses between the control signal and the reference signal.

9. The absolute time delay generating device of claim 7, wherein the control unit and the reference unit comprise delay elements having different delay properties respectively, and the delay elements having different delay properties are made of materials of different delay properties.

10. The absolute time delay generating device of claim 7, wherein the control unit and the reference unit comprise delay elements having different numbers of serial connections respectively to provide different delay properties.

11. The absolute time delay generating device of claim 7, wherein the control unit and the reference unit comprise delay elements having different circuit structures respectively to provide different delay properties.

12. The absolute time delay generating device of claim 4, wherein the at least a delay module comprises a plurality of delay modules, and the control units of the plurality of delay modules comprise delay elements having different delay properties respectively.

13. The absolute time delay generating device of claim 12, wherein the delay elements having different delay properties allow delay statuses to be generated between the control signals generated by the control units of the plurality of delay modules.

14. The absolute time delay generating device of claim 12, wherein the control units of the plurality of delay modules comprise delay elements made of materials having different delay properties respectively.

15. The absolute time delay generating device of claim 12, wherein the control units of the plurality of delay modules comprise delay elements having different numbers of serial connections to provide different delay properties.

16. The absolute time delay generating device of claim 12, wherein the control units of the plurality of delay modules comprise delay elements having different circuit structures to provide different delay properties.

17. The absolute time delay generating device of claim 1, wherein the delay parameters comprise at least a phase ratio and/or at least a frequency ratio.

18. The absolute time delay generating device of claim 17, wherein the ratio is defined as, $$\tau(P, V, T) = \frac{d_{VAR}(P, V, T)}{d_{REF}(P, V, T)},$$

wherein $d_{VAR}(P,V,T)$ is delay of variable control unit, and $d_{REF}(P,V,T)$ is delay of reference unit.

19. The absolute time delay generating device of claim 18, wherein the signal phase/frequency control module is configured to compare the ratios for the at least a delay module, allow the compared ratios to correspond to a delay status of the control unit in the delay module, and determine the delay status of the absolute time delay generating device.

20. The absolute time delay generating device of claim 1, wherein a number of the reference unit and the control unit in the at least a delay module is based on delay performance differences between the reference unit and the control unit, between the reference unit and the reference unit, and between the control unit and the control unit in response to PVT variations, and the differences are phase differences or frequency differences.

* * * * *